2 Sheets. Sheet 1.
B. Crawford,
Steam-Boiler Furnace.
No. 1,357. Reissued Dec. 2, 1862.
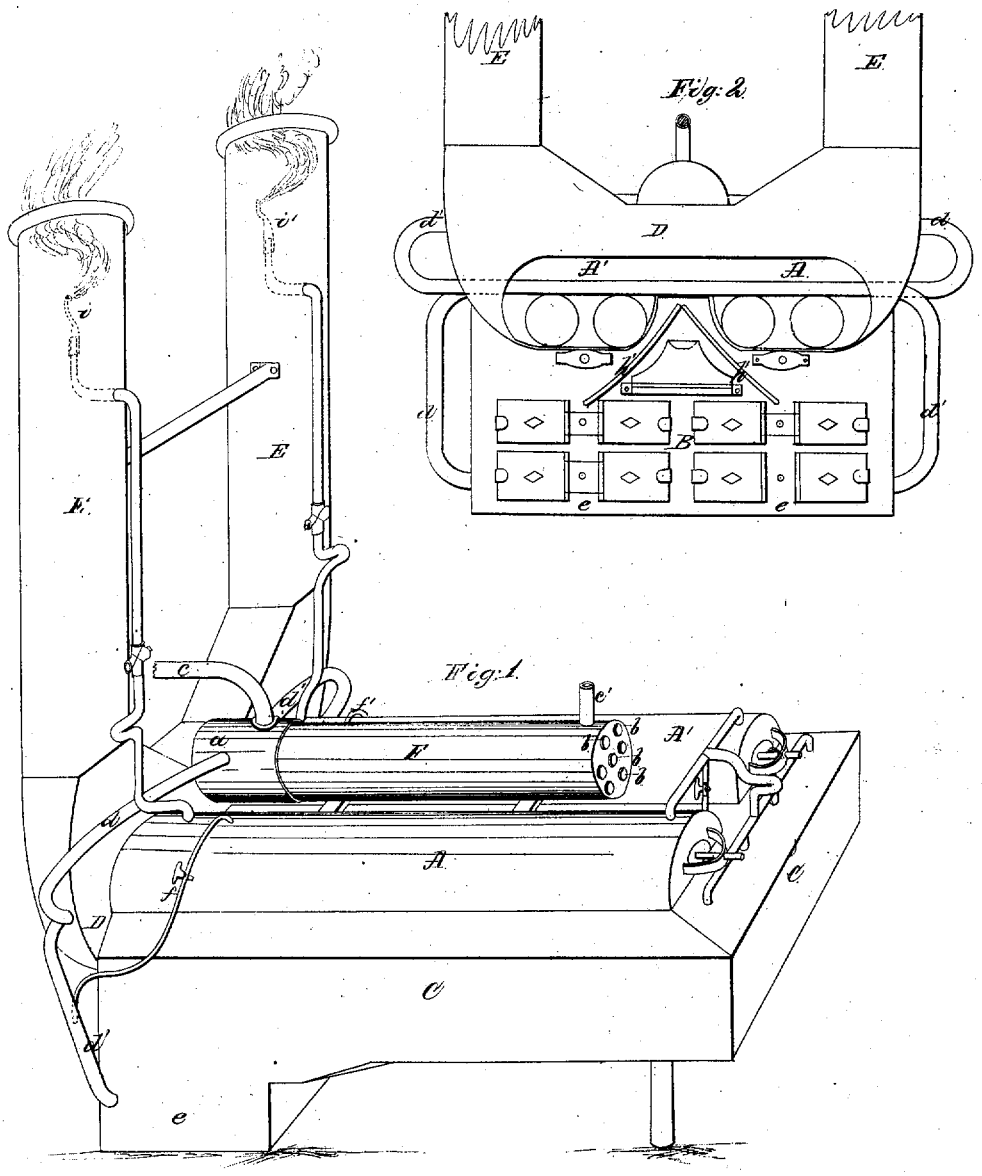
N. PETERS, PHOTO-LITHOGRAPHER, WASHINGTON, D. C.

2 Sheets-Sheet 2.
B. Crawford,
Steam-Boiler Furnace.
No. 1,357. Reissued Dec. 2, 1862.
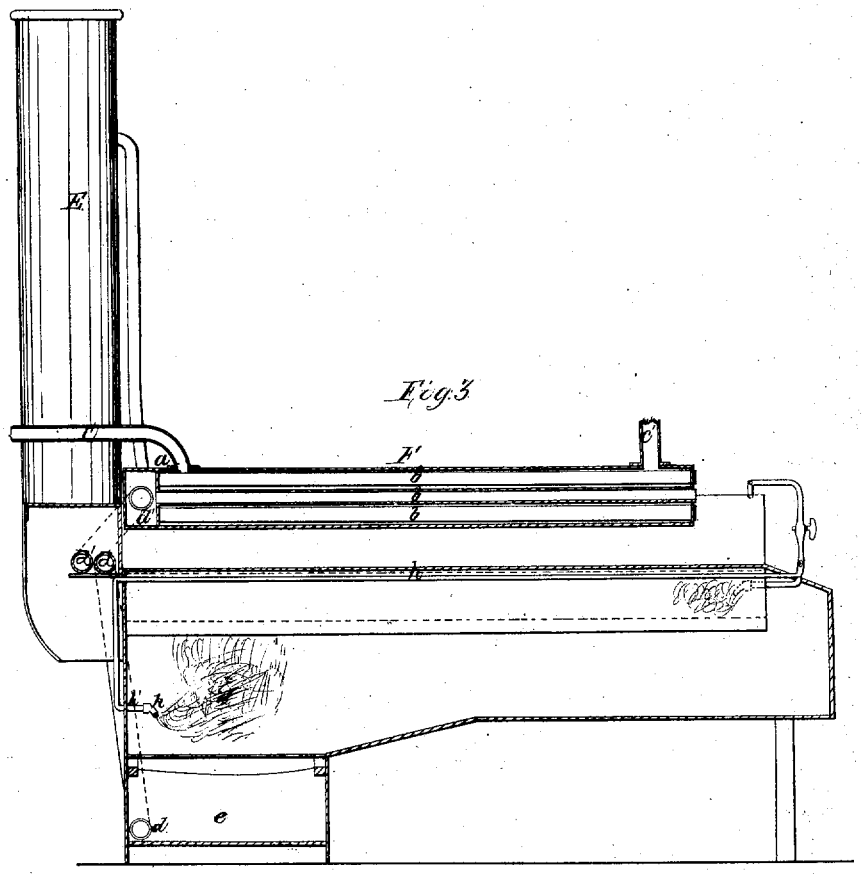
N. PETERS, PHOTO-LITHOGRAPHER, WASHINGTON, D. C.

UNITED STATES PATENT OFFICE.

BENJAMIN CRAWFORD, OF ALLEGHENY, PENNSYLVANIA, ASSIGNOR TO ENGLISH, BENNETT, FRISBEE, & CRAWFORD.

IMPROVEMENT IN STEAM-BOILER FURNACES.

Specification forming part of Letters Patent No. 7,051, dated January 29, 1850; Reissue No. 1,357, dated December 2, 1862.

*To all whom it may concern:*

Be it known that I, BENJAMIN CRAWFORD, of the city and county of Allegheny, and State of Pennsylvania, have invented certain new and useful Improvements in Promoting Combustion in Steam-Boiler Furnaces; and I do hereby declare that the following is a full, clear, and exact description of the same, reference being had to the accompanying drawings, forming part of this specification, in which—

Figure 1 is a perspective view of a pair of flue-boilers fitted with my improvements. Fig. 2 is a front elevation, and Fig. 3 is a vertical longitudinal section of the same through the center.

Similar letters of reference in the several figures indicate corresponding parts.

The first part of my invention consists in whirling ajutages on the ends of pipes used in connection with steam-boilers for the purpose of promoting combustion of fuel.

The second part of my invention consists in the injection of jets of steam in a whirling state among the gases evolved by the fuel on the grates by the agency of whirling ajutages and the pressure in the boiler or steam-vessel.

The third part of my invention consists in increasing the draft by steam-blowers in the combustion-chamber, or flues, or smoke-stack, or other part of the furnace other than the ash-pit, the said blowers being connected with the steam generator or boiler.

The fourth part of my invention consists in introducing a combined stream of mingled steam and hot air into the ash-pit of a steam-boiler furnace.

The fifth part of my invention consists in a combination, which, first, heats the air required for the combustion of the fuel by the waste steam from the engine and by the waste heat from the boilers; second, forces the heated air through the ash-pit into the fire by jets of steam supplied direct from the steam-blower, the boiler, and forced along with the heated air into the fire; third, supplies and heats and introduces in whirling jets other streams of steam among the gases evolved by the fuel on the grates, and, fourth, maintains or increases the draft of the furnace or flues or smoke-pipes.

To enable others skilled in the art to embody my invention into a practical form, I will proceed to describe the same with reference to the drawings.

In the drawings, A A′ are two flue-boilers, with their fire-chamber B, casing C, flue-heads D, and smoke-pipes E E. Above the boilers I place a cylindrical or other suitable-shaped vessel, F, into one end, *a*, of which the exhaust-steam from the engine is introduced by a pipe, *c*. The vessel is traversed from end to end by tubes *b b b*, between which the steam passes, and such portions as escape condensation are discharged through pipe *c′* at the end of the vessel opposite to that at which it was admitted. The tubes are all connected at their front ends with a pipe which branches outward from the vessel in opposite directions. Each branch *d d′* proceeds outward and downward until it is clear of the flue heads. It is then returned, and, extending through the whole breadth of the flue-heads, passes out through the side opposite to that through which it is entered. It is now again bent downward and returned into the ash-pit *e* beneath the grate-bars. The arrangement of pipes thus described constitutes a heater by which the air required for the combustion may be heated to a high temperature previously to its action upon the fuel. The cold air enters the hinder ends of the tubes *b b b*, and proceeding through them absorbs the heat from the waste steam, by which they are surrounded, to such a degree that much of the steam is condensed; thence passing through the pipes *d d′* it abstracts an additional quantity of heat from the spent flame in the flue-heads D, and enters the closed ash-pit in a highly-heated state. As the draft alone might be insufficient to draw the requisite quantity of air through the heater, the velocity of the current in the air-pipes *d d′* may be increased by jets of steam discharged through the air-pipes toward the ash-pit, at or near their lower extremities. The steam for this purpose may be brought directly from the boiler through small pipes *f f′*, which enter the air-pipes and proceed in the same direction with them toward the ash-pit. The jets of steam thus introduced increase the currents of air in the pipes *d d′*, and draw a sufficient quantity through the heater to produce a rapid combustion of the fuel on the grate. In order to complete the combustion of the gases arising from the fuel-burning grate, I inject among them steam heated to the proper temperature by passing it through longitudinal pipes *h*, placed in the upper angles of the roof of the direct flues between the boilers. These pipes pass through the front wall of the furnaces, where they are divided into several branches, *h′ h′*, which proceed downward against the outer face of the front wall until they are at the proper distance above the grate, when they are turned inward and passed through the front wall into the furnace. The extremity of each branch is furnished with a self-revolving adjutage, *k*, hereinafter described, by which the intensely-heated steam is distributed among the gases evolved from the burning fuel.

As the heat of the spent flame in the flue-heads is absorbed to a great extent by the air in the pipes, the draft of the smoke-pipes may require to be increased in order to be sufficient to draw the flame from the furnaces through the flues. This may be done by the use of steam-jets discharged through self-revolving ajutages *i i′* of the same form as those used for supplying heated steam above the grate.

The blow-pipes in the smoke-flues are very essential, whether the ajutages are on them or not. They, beside aiding the draft, answer as a means for keeping the flues free from the adherence of soot, which, if allowed to accumulate, soon clogs the flues when bituminous coal is used. In fact, this is the principal advantage in using the steam-blowers in the flues, for by this location of the blowers they can be used for blowing out the soot when the flues become foul. I prefer to discharge the steam through blowers, which do not whirl the steam in the flues, and therefore do not confine myself under this head to the whirling ajutages.

Each ajutage is formed of a short pipe, one end of which is straight and is fitted upon the open extremity of the steam-pipe. The other extremity is twisted, and the steam is discharged therefrom in a direction oblique to both the axis and radii of the steam-pipe, thus giving by the reaction of its effluent force a whirling motion to the ajutage, which in turn imparts a similar motion to the issuing steam. A furtherance of this draft may be effected by locating whirling ajutages $i^2$ in the after end of the flues.

The whirling motion given to the heated steam discharged above the fuel mingles it thoroughly with the combustible gases and completes their combustion, while at the same time the air in passing through the tubes *b b* and pipes *d d′* absorbs the heat from the exhaust-steam and spent flame and prevents the loss of heat that would otherwise take place.

The whirling motion produced in the smoke-pipes produces an equable current throughout their whole cross-section, and produces a much greater draft with the same expenditure of steam than could be obtained by allowing the steam to issue vertically upward in the smoke-pipes.

I do not confine myself to the combination of a heater with the blowers which are used for the purpose of increasing the draft in the combustion-chamber, or flues, or smoke-stack, or other part of the furnace above and beyond the ash pit, as air may be supplied to the fire and to the vacuum created by the blowers in any of the known practical ways of supplying air in such structures.

What I claim as my invention, and desire to secure by Letters Patent, is—

1. The injection of whirling jets of steam among the gases evolved by the fuel on the grates, for the purpose set forth.

2. Self-whirling ajutages or their equivalents on the pipes leading from the boiler or steam-blower to proper positions for increasing the draft or promoting combustion, substantially as set forth.

3. Whirling live steam for the purpose of increasing or maintaining the drafts of a steam-boiler furnace, substantially as set forth, or the equivalent thereto.

4. A combined stream of mingled steam and hot air introduced and forced into the ash-pit and up through the fire of a steam-boiler furnace by means of the steam-boiler and hot-air and steam pipes, which intersect one another and terminate in a discharging-nozzle within the ash-pit, substantially as set forth, or the equivalent thereto.

5. Live steam blowers, arranged in the flues of a steam-boiler, for the purpose of aiding the draft and blowing out the foul matter which accumulates in the flues.

6. The combination of means, as set forth, for performing unitedly the several functions specified.

BENJ. CRAWFORD.

Witnesses:
REDMOND J. GRACE,
JOSEPH FRENCH.